United States Patent
Haruyama

[11] Patent Number: 5,902,948
[45] Date of Patent: May 11, 1999

[54] PERFORMANCE INSTRUCTING APPARATUS

[75] Inventor: Kazuo Haruyama, Hamamatsu, Japan

[73] Assignee: Yamaha Corporation, Hamamatsu, Japan

[21] Appl. No.: 08/856,301

[22] Filed: May 14, 1997

[30] Foreign Application Priority Data

May 16, 1996 [JP] Japan .................................. 8-144846

[51] Int. Cl.$^6$ .................................................. G09B 15/02
[52] U.S. Cl. .............................. 84/609; 84/649; 84/477 R
[58] Field of Search .................................. 84/477 R, 478, 84/609, 634, 649, 650

[56] References Cited

U.S. PATENT DOCUMENTS

| | | | |
|---|---|---|---|
| 4,694,723 | 9/1987 | Shinohara et al. | 84/478 X |
| 5,069,104 | 12/1991 | Shibukawa . | |
| 5,486,646 | 1/1996 | Yamashita et al. | 84/611 X |
| 5,496,963 | 3/1996 | Ito | 84/478 X |
| 5,544,562 | 8/1996 | Jeon | 84/470 R |
| 5,656,789 | 8/1997 | Nakada et al. | 84/477 R |

FOREIGN PATENT DOCUMENTS 6-2714162  9/1994  Japan .

Primary Examiner—William M. Shoop, Jr.
Assistant Examiner—Jeffrey W. Donels
Attorney, Agent, or Firm—Graham & James LLP

[57] ABSTRACT

A performance instructing apparatus is provided wherein data that meet a predetermined condition or conditions are extracted from each predetermined range of automatic performance data, and the predetermined range and the predetermined condition used when the data are extracted are changed depending upon a performance level entered through a performance level input device. The data extracted from the automatic performance data may be used for guiding a player through the performance.

24 Claims, 12 Drawing Sheets

FIG.3

METER

| | 1 | 2 | 3 | 4 |
|---|---|---|---|---|
| 1 | C4 | E4 | C4 | G4 |
| 2 | ⋮ | ⋮ | ⋮ | ⋮ |
| 3 | ⋮ | ⋮ | ⋮ | ⋮ |
| 4 | ⋮ | ⋮ | ⋮ | ⋮ |
| 5 | ⋮ | ⋮ | ⋮ | ⋮ |
| 6 | ⋮ | ⋮ | ⋮ | ⋮ |
| 7 | ⋮ | ⋮ | ⋮ | ⋮ |
| 8 | ⋮ | ⋮ | ⋮ | ⋮ |
| 9 | ⋮ | ⋮ | ⋮ | ⋮ |
| ⋮ | ⋮ | ⋮ | ⋮ | ⋮ |

MEASURE (row label)

FIG.13A

BUFFER 1

| | KC | ELAPSED TIME(KC) |
|---|---|---|
| 1 | KC | ELAPSED TIME(KC) |
| ⋮ | ⋮ | ⋮ |
| 32 | KC | ELAPSED TIME(KC) |

FIG.13B

BUFFER 2

| | KC | ELAPSED TIME(KC) |
|---|---|---|
| 1 | KC | ELAPSED TIME(KC) |
| ⋮ | ⋮ | ⋮ |
| 32 | KC | ELAPSED TIME(KC) |

PERFORMANCE INSTRUCTING APPARATUS

BACKGROUND OF THE INVENTION

1. Field of the Invention

The present invention relates to a performance instructing apparatus adapted to arrange automatic performance data and produce performance guide data used for guiding a player through performance.

2. Prior Art

Conventionally, a performance instructing apparatus having a performance guide function is known wherein a light-emitting diode (LED) (keyboard LED) provided for each key on a keyboard is turned on as automatic performance data representing a tune or a song is reproduced, so as to inform a player of the timing when the key should be depressed, and wherein the reproduction of the tune is stopped until the player depresses the key designated by the light-emitting diode. Thus, the reproduction of the automatic performance data proceeds concurrently with the performance of the player guided by the apparatus (concurrent proceedings).

In a known method for guiding the player through the performance, a track (guide track) exclusively used for performance guide is provided in addition to tracks for the automatic performance data, and performance guide data (for example, key codes of keys to be depressed by the player) are stored in this guide track, so as to allow the concurrent proceedings as described above. In this method, the automatic performance data are read from the automatic performance data tracks as the tune goes on, while at the same time the performance guide data are read from the guide track, to thus perform the concurrent proceedings based on the performance guide data thus read. To enable the player to practice the tune according to the performance level of himself/herself, it has been proposed to prepare a plurality of kinds of performance guide data that vary with respective performance levels, to thus allow the player to select a desired one from the data thus prepared.

Although the conventional performance instructing apparatus as described above may enable the player to practice a tune or a song according to his/her performance level, the level of the performance guide is determined or limited by the prepared performance guide data. If performance guide data that matches the level of the player are not prepared for the tune the player wishes to practice, therefore, the player must practice the tune at a level different from the player's performance level. Even if the tune selected by the player based on his/her performance level includes some grace notes, chords and the like which are difficult to play, the player is directed by the performance guide to play these notes and chords as they are. This may cause the player to give up practicing before achieving a desired level, particularly in the case where the player is a beginner.

SUMMARY OF THE INVENTION

It is therefore a first object of the invention to provide a performance instructing apparatus that is able to produce performance guide data depending upon the performance level of a player.

It is a second object of the invention to provide a performance instructing apparatus that is able to produce performance guide data depending upon the performance level of a player and provide a performance guide based on the thus produced performance guide data.

To attain the first object, there is provided a performance instructing apparatus comprising performance level input means for entering a performance level, and data extracting means for extracting data that meet a predetermined condition, from each predetermined range of automatic performance data to be reproduced in a manner corresponding to the performance level entered by the performance level input means.

In the performance instructing apparatus constructed as described above, data that meet a predetermined condition are extracted from each predetermined range of automatic performance data to be reproduced in a manner corresponding to the entered performance level. Accordingly, the performance guide data that match the level of the player can be always prepared, thus saving time and effort for finding performance guide data suitable for the performance level of the player.

To attain the first object, there is also provided a performance instructing apparatus comprising data extracting means for extracting data that meet a predetermined condition from each predetermined range of automatic performance data, performance level input means for entering a performance level; and changing means for changing the predetermined range and the predetermined condition used when the data extracting means extracts the data, depending upon the performance level entered through the performance level input means.

In the performance instructing apparatus constructed as described above, the predetermined range and predetermined condition used when the data are extracted by the data extracting means are changed depending upon the performance level entered through the performance level input means. Accordingly, the performance guide data that match the level of the player can be always prepared, thus saving time and effort for finding performance guide data suitable for the performance level of the player.

To attain the second object, the above-described performance instruction means may further include performance guide means for providing a performance guide using the data extracted by the data extracting means.

Since the performance guide means guides the player through the performance, using the data extracted by the data extracting means, a wide range of performance guide can be provided depending upon the performance level that varies from the beginners's level to the senior's level.

Preferably, the predetermined range is measure of the automatic performance data.

Alternatively, the predetermined range is phrase of the automatic performance data.

Also preferably, the predetermined condition includes a condition that the data that is to be extracted from the automatic performance data is event data representing a chord and has a predetermined pitch.

Further preferably, the predetermined condition includes a condition that the data that is to be extracted from the automatic performance data is event data corresponding to a key-on event occurring latest in a first predetermined portion of the predetermined range or event data corresponding to a key-on event occurring earliest in a latter predetermined portion of the predetermined range.

Preferably, the performance guide means comprises display means operable at a frequency depending upon the performance level entered through the performance level input means.

To attain the second object, there is provided a performance instructing apparatus comprising: data extracting means for extracting data that meet a predetermined condition from each predetermined range of automatic performance data; performance level input means for entering a performance level; extracted data selecting means for selecting data from the data extracted by the data extracting means, depending upon the performance level entered through the performance level input means; and performance guide means for provide a performance guide using the data selected by the extracted data selecting means.

In the performance instructing apparatus constructed as described above, the performance guide is provided using data that are selected from the data extracted by the data extracting means, depending upon the performance level entered through the performance level input means. Accordingly, a wide range of performance guide can be provided depending upon the performance level that varies from the beginners's level to the senior's level.

Further, to attain the first object, there is provided a machine readable storage medium storing a program for instructing execution of a performance instructing method comprising a performance level input step of entering a performance level, and a data extracting step of extracting data that meet a predetermined condition, from each predetermined range of automatic performance data to be reproduced in a manner corresponding to the performance level entered by the performance level input step.

To attain the first object, there is also provided a machine readable storage medium storing a program for instructing execution of a performance instructing method comprising a data extracting step of extracting data that meet a predetermined condition, from each predetermined range of automatic performance data, a performance level input step of entering a performance level, and a changing step of changing the predetermined range and the predetermined condition used when the data extracting step extracts the data, depending upon the performance level entered through the performance level input step.

To attain the second object, there is provided a machine readable storage medium storing a program for instructing execution of a performance instructing method comprising a data extracting step of extracting data that meet a predetermined condition, from each predetermined range of automatic performance data, a performance level input step of entering a performance level, an extracted data selecting step of selecting data from the data extracted by the data extracting step, depending upon the performance level entered through the performance level input step, and a performance guide step of providing a performance guide using the data selected by the extracted data selecting step.

The above and other objects, features, and advantages of the invention will become more apparent from the following detailed description taken in conjunction with the accompanying drawings.

BRIEF DESCRIPTION OF THE DRAWINGS

The invention will be described in greater detail with reference to a certain preferred embodiment thereof and the accompanying drawings, wherein;

FIG. 3 is a view showing an example of the construction of a subsampled data buffer provided in a predetermined area of a RAM shown in FIG. 1;

FIG. 13A is a view showing a format of data stored in a buffer 1;

FIG. 13B is a view showing a format of data stored in a buffer 2;

DETAILED DESCRIPTION OF THE PREFERRED EMBODIMENT

Referring to the accompanying drawings, one preferred embodiment of the present invention will be described in detail.

Figure 1:
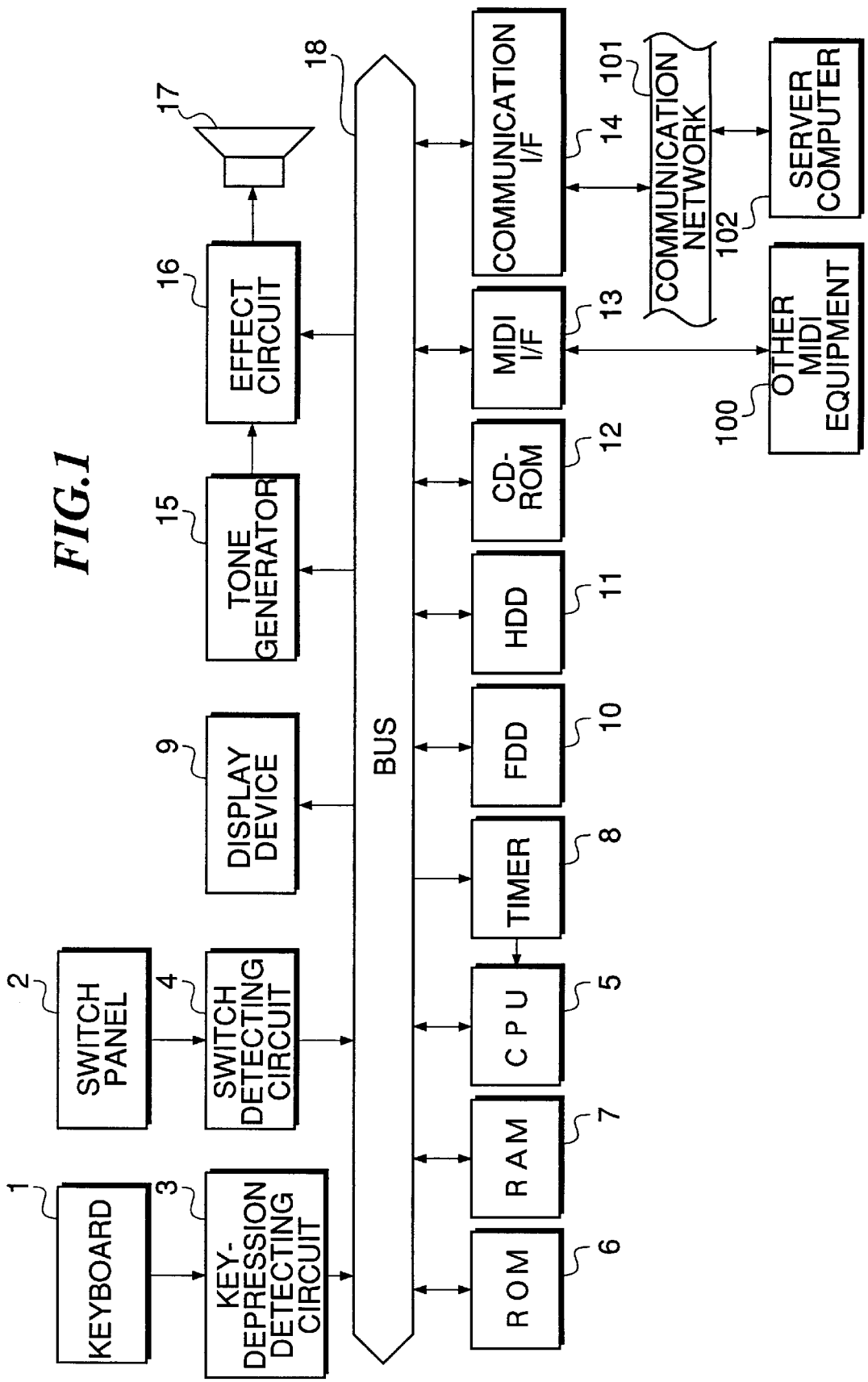
FIG. 1 is a block diagram showing the schematic construction of an electronic keyboard instrument to which a performance instructing apparatus according to one embodiment of the present invention is applied.

FIG. 1 is a block diagram showing the schematic construction of an electronic keyboard instrument which employs a performance instructing apparatus constructed according to the preferred embodiment of the present invention.

As shown in FIG. 1, the electronic keyboard instrument of the present embodiment includes a keyboard 1 for entering pitch information, a switch panel or switch board 2 including a plurality of switches for entering various kinds of information, a key-depression detecting circuit 3 for detecting the depressed state of each key on the keyboard 1, a switch detecting circuit 4 for detecting the operated state of each switch on the switch panel 2, a CPU 5 that governs control of the whole apparatus, a ROM 6 that stores control programs to be executed by the CPU 5, table data and others, a RAM 7 that temporarily stores automatic performance data, various kinds of input information, operation results and others, a timer 8 for counting interrupt time in a timer interrupt routine and various other time periods, and a display device 9 that displays various kinds of information and includes a large-sized LCD or CRT, and LEDs and others, for example. The electronic keyboard instrument further includes a floppy disc drive (FDD) 10 for driving a floppy disc (FD) as a storage medium, a hard disc drive (HDD) 11 as an external memory device for storing various application programs including the above control programs, various data and the like, a CD-ROM drive 12 for driving a compact-disc read only memory (CD-ROM) that stores various application programs including the control programs, various data and the like, a MIDI interface (I/F) 13 which receives MIDI (Musical Instrument Digital Interface) signals from an external device, or generates the MIDI signals to the external device, and a communication interface (I/F) 14 through which data are received from and transmitted to a server computer 102, for example, through a communication network 101. The electronic keyboard instrument further includes a tone generator circuit 15 that converts performance data entered through the keyboard 1, automatic performance data and others, into tone signals, an effect circuit 16 for imparting various effects to the tone signals received from the tone generator circuit 15, and a sound system 17, such as a loudspeaker, for converting the tone signals received from the effect circuit 16 into sound.

The component elements 3–16 described above are connected to each other through a bus 18, and the timer 8 is connected to the CPU 5. Other MIDI equipment 100 is connected to the MIDI I/F 13, and the communication network 101 is connected to the communication interface (I/F) 14. Further, the effect circuit 16 is connected to the tone generator circuit 15, and the sound system 17 is connected to the effect circuit 16.

The HDD 11 stores control programs to be executed by the CPU 5 as described above. Where a desired control program is not stored in the ROM 6, the control program is stored in a hard disc in this HDD 11, and the thus stored program is read into the RAM 7 so that the CPU 5 can perform substantially the same operations as in the case where the control program is stored in the ROM 6. This arrangement facilitates addition of control programs and upgrading of the version of the programs.

Control programs and various data read from the CD-ROM in the CD-ROM drive 12 are stored in the hard disc within the HDD 11. This makes it easy to install new control programs and upgrade the version of the programs, for example. In addition to the CD-ROM drive 12, various other devices, such as a magneto-optical disc (MO) drive, which utilize various forms of media may be provided as external memory devices.

As described above, the communication I/F 14 is connected to the communication network 101, such as a LAN (local area network), Internet and telephone line, and is connected to the server computer 102 through the communication network 101. Where some kinds of programs or parameters are not stored in the hard disc drive 11, the communication I/F 14 may be used for downloading desired programs and parameters from the server computer 102. A client computer (electronic instrument of the present embodiment) transmits commands to the server computer 102 through the communication I/F 14 and communication network 101, so as to request downloading of the desired programs and parameters. The server computer 102 receives the commands and delivers the requested programs and parameters to the client computer through the communication network 101, and the computer receives these programs and parameters, through the communication I/F 101, and stores them in the hard disc drive 11. In this manner, the downloading operation is completed.

Figure 2:
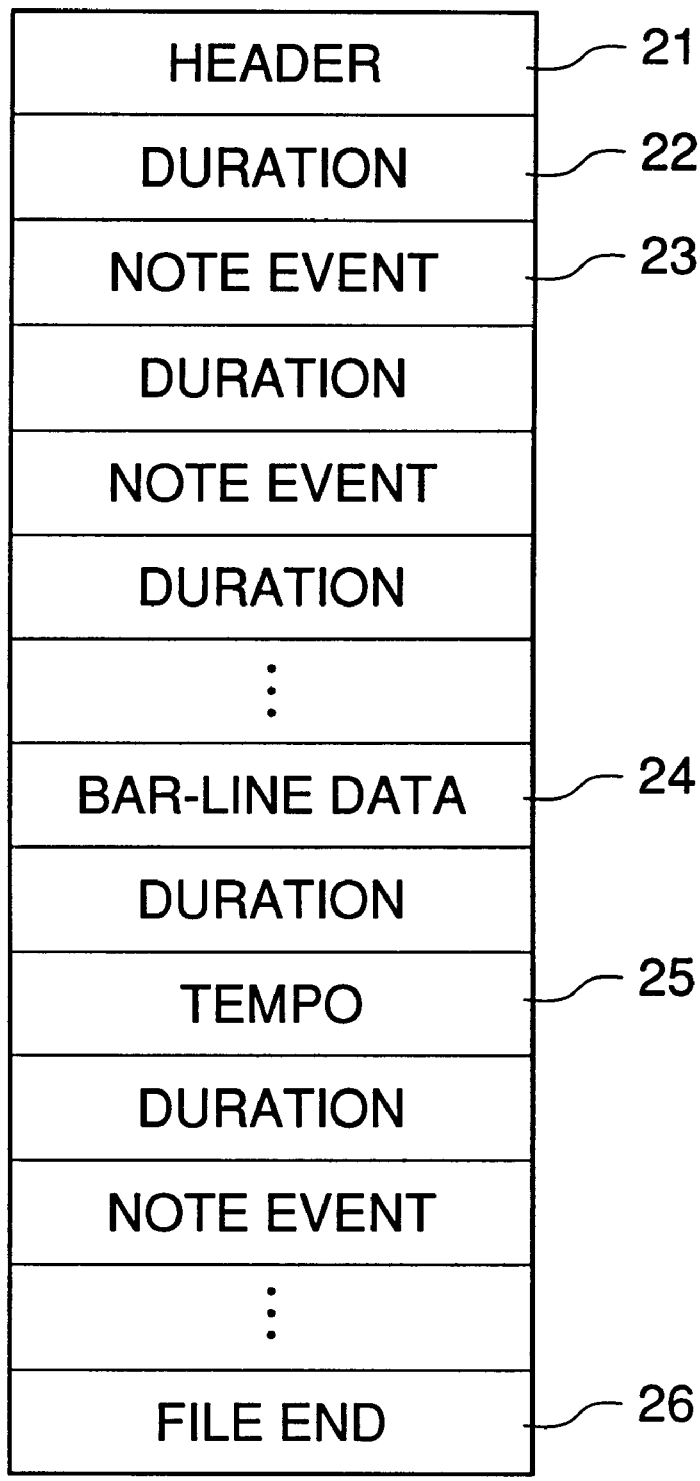
FIG. 2 is a view showing a data format of performance data.

FIG. 2 shows the format of the above-indicated automatic performance data.

As shown in FIG. 2, the automatic performance data principally consists of header data 21, duration data 22, note event data 23, bar-line data 24, tempo data 26 and file end data 26.

The header data 21 represent data stored at the head of the automatic performance data. In the present embodiment, a tune or song title, an initial tempo and other data are stored as the head data 21.

The duration data 22 are time data representing time intervals between event data (note event data 23, bar-line data 24 and tempo data 26 in this embodiment).

The note event data 23 denote two kinds of data, namely, note-on event data and note-off event data. The note-on event data consists of such data as note-on, MIDI channel, note number, and velocity. The note-off event data consists of such data as note-off, MIDI channel and note number. The MIDI channel consists of 16 channels, for example, wherein channels 1 and 2 are respectively allotted to right-hand data and left-hand data, and other channels are allotted to event data for accompaniment. In this connection, the channels 1 and 2 denote MIDI channels that are allotted to note event data for guiding performance, and the right-hand data denote note event data to be played with the right hand of a player, while the left-hand data denote note event data to be played with the left hand of the player. Thus, each kind of note event data is stored with the corresponding MIDI channel. This is because, in the present embodiment, the note event data 23 are stored such that they are arranged in a single row in the order of output regardless of the kind of each event, and, when the data 23 are actually read out and processed, the kind of the event is determined based on the corresponding MIDI channel so that the relevant note event is processed according to the result of the determination.

While the note-off event data do not include the velocity in the present embodiment, it is needless to say that the note-off event data may include the velocity.

The bar-line data 24 denote data representing a bar-line, and the tempo data 25 denote data for changing the tempo. The file end data 26 denote data indicating the end of the file, namely, the end of the automatic performance data.

Although the actual automatic performance data include other data than the above-described data, such other data are not essential for explaining the present invention, and thus description thereof is omitted.

While the event data are stored such that they are arranged in a single row in the order of output regardless of the MIDI channels allotted to the event data, the present invention is not limited to this form of data storage. For example, tracks corresponding to the respective MIDI channels may be provided, and each track may be allotted to the corresponding kind of event data. In this arrangement, each kind of the note event data need not be stored with the MIDI channel as described above, but the memory capacity will be increased.

In the present embodiment, the data format of the automatic performance data is constructed in the form of "event data+duration data" as described above. The data format used in the present invention, however, is not limited to this form, but may be any format, such as "event data+relative time data", "event data+absolute time data" or "pitch data+note length data".

FIG. 3 shows one example of the construction of a subsampled data buffer for thinning the automatic performance data provided in a predetermined area of the RAM 7. As shown in this figure, the subsampled data buffer stores a key code selected for each beat in each measure from the automatic performance data. In the present embodiment, only note-on event data located in the position of quarter notes in the automatic performance data are selected and extracted or sampled out, and the key codes of the thus selected event data are stored (registered) as data for guiding the performance.

The operation of the electronic keyboard instrument constructed as above will now be described. LEDs are provided for respective keys of the keyboard 1. The electronic keyboard instrument is provided with a performance guide function of designating a key to be depressed by lighting a keyboard LED corresponding to the key, based on automatic performance data on guide tracks (channels 1 and 2), and determining whether the player has correctly operated the designated key. The performance guide function employs four performance guide levels 0 to 3, the guide level "0" being for beginners and the guide level 3 for seniors. The player can select a guide level corresponding to his own performance level by operating one of performance guide level-selecting switches provided on the switch board 2. When the guide level 3 is selected, data on the guide tracks per se are used for performance guide, and therefore the player must depress a correct key for each event data. On the other hand, when the guide level 0, 1 or 2 is selected, event data stored in the subsampled data buffer are used for performance guide, and therefore the player has only to depress a correct key corresponding to each of event data which are reduced in amount, obtained by thinning the event data.

Referring next to FIG. 4 through FIG. 15, there will now be described control routines executed by the electronic keyboard instrument constructed as described above.

Figure 4:
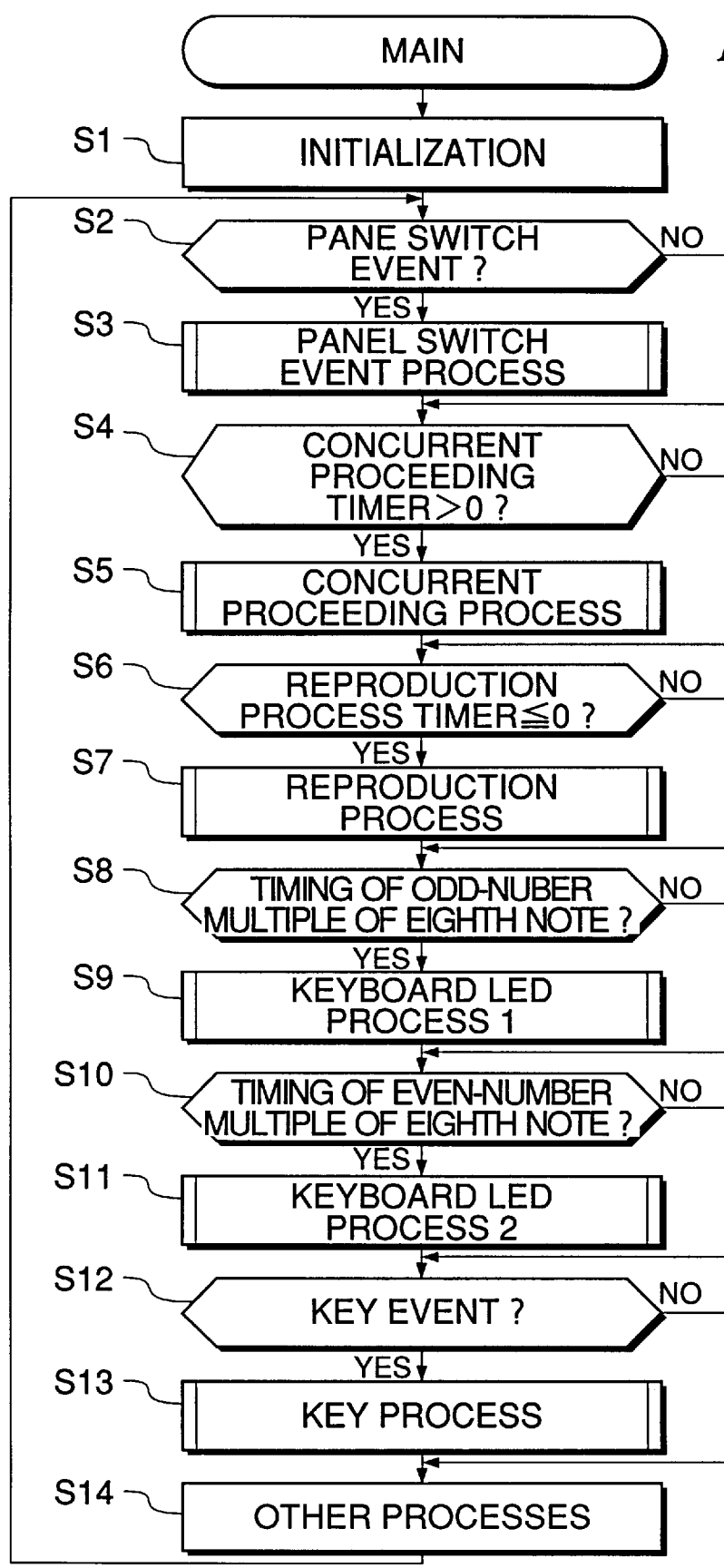
FIG. 4 is a flowchart showing a flow of a main routine executed by the electronic keyboard instrument of FIG. 1, more particularly, by a CPU.

FIG. 4 is a flowchart showing the flow of a main routine executed by the CPU 5, in particular, of the electronic keyboard instrument of the present embodiment.

In FIG. 4, first, at a step S1 initialization, is effected by clearing the MIDI I/F 13, communication I/F 14, timer 8, elements associated with graphics (not shown), such as VRAM (video RAM), for displaying images on the display device 9, and so on, and opening a tune or song data file of an automatic performance tune or song to be played. In the present embodiment, a plurality of files of automatic performance tune or song data are stored in the above-indicated FDD 10, and one or more of these tune or song data files is/are read out in response to the instruction of the player, and then loaded in a tune or song data storage region provided in a predetermined area of the RAM 5. In this connection, the automatic performance tune or song data to be played may be selected from a plurality of sets of such data that are preliminarily stored in the ROM 6, or may be supplied from the CD-ROM drive 12 or from an external source through the MIDI I/F 13 or communication I/F 14.

At the next step S2, it is determined whether a switch event has occurred on the switch panel 2, namely, any switch on the switch panel 2 has been operated or not. If the step S2 determines the occurrence of the switch event, a panel switch event process subroutine for performing processing according to the switch event is executed at a step S3. This subroutine will be described later, referring to FIG. 5. If no switch event has occurred, namely, if no switch has been operated, on the other hand, the step S3 is skipped and the control flow goes to a step S4.

At the step S4, it is determined whether the value of a concurrent proceeding timer as a software timer provided in a predetermined area of the RAM 7 is greater than 0 or not. The concurrent proceeding timer used herein denotes a timer for counting elapsed time (time KC) after key codes KC are stored in a buffer 1 and a buffer 2 (FIG. 13) in response to note-on events of the automatic performance data and key-depression events where keys are depressed by the player, respectively. Each of the buffers 1 and 2 is provided in a predetermined area of the RAM 7, and has a capacity enough to store a maximum of 32 key codes KC and the elapsed time (time KC) after storage of each key code KC.

Figure 7:
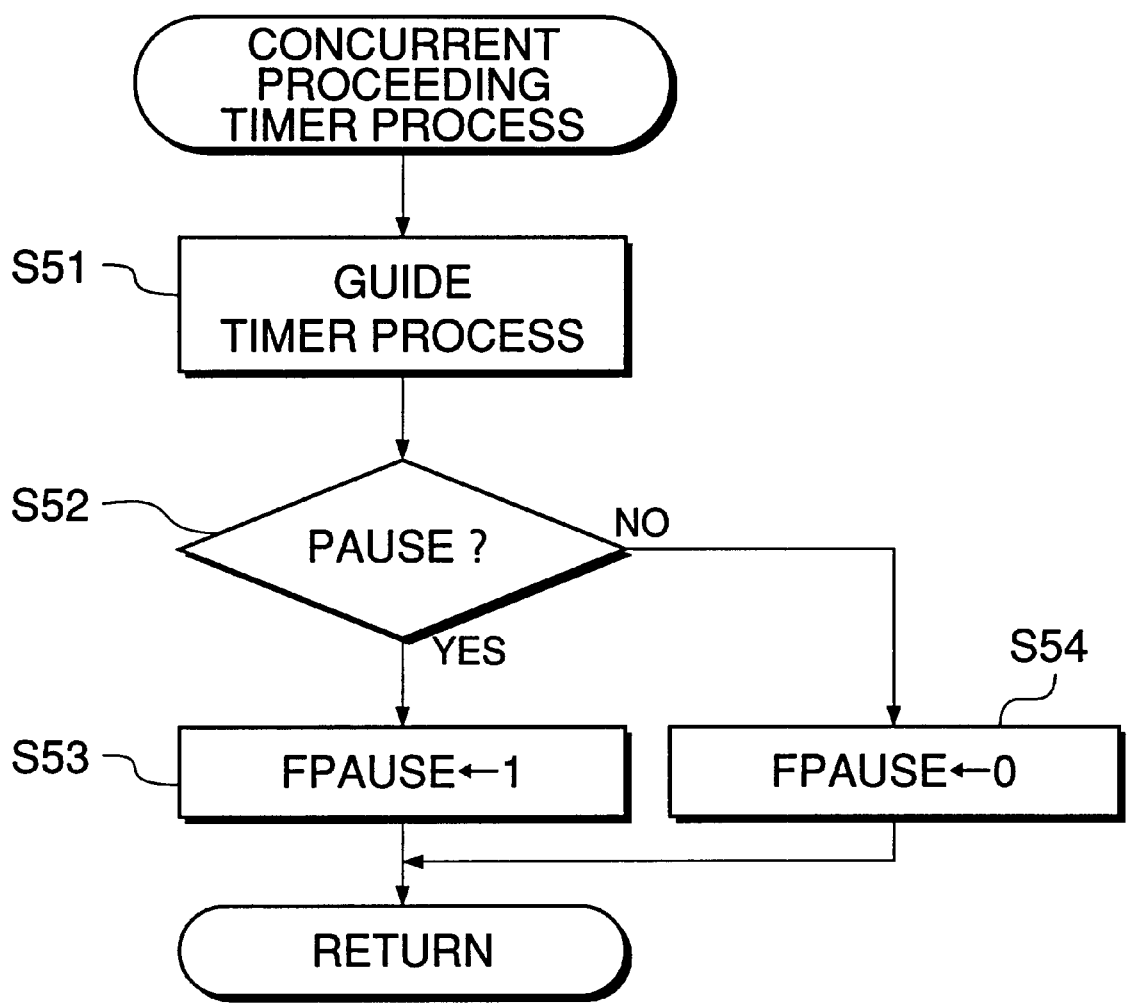
FIG. 7 is a flowchart showing in detail a flow of a concurrent proceeding timer process subroutine in FIG. 4.

If the step S4 determines that the value of the concurrent proceeding timer is greater than 0, a concurrent proceeding timer process routine which will be described later using FIG. 7 is executed at a step S5. If the value of the concurrent proceeding timer is equal to or smaller than 0, on the other hand, the step S5 is skipped and the control flow goes to a step S6.

Figure 8:
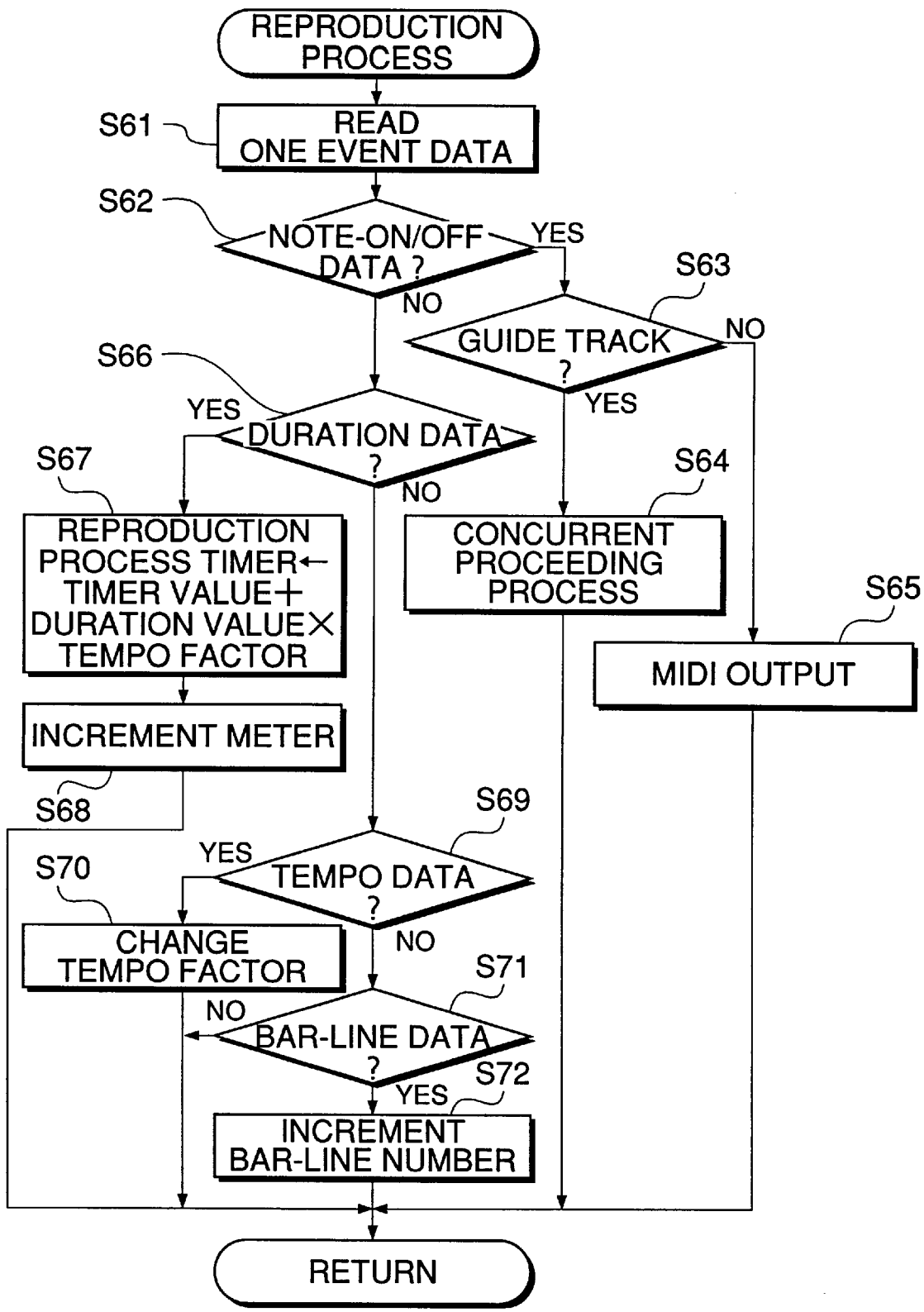
FIG. 8 is a flowchart showing in detail a flow of a reproduction process subroutine in FIG. 4.

To reproduce the automatic performance data, it is determined at the step S6 whether the value of a reproduction process timer as a soft timer provided in a predetermined area of the RAM 7 is greater than 0 or not. If the step S6 determines that the value of the reproduction process timer is equal to or smaller than 0, a reproduction process subroutine which will be described later using FIG. 8 is executed at a step S7. If the value of the reproduction process timer is greater than 0, the step S7 is skipped and the control flow goes to a step S8.

Figure 9:
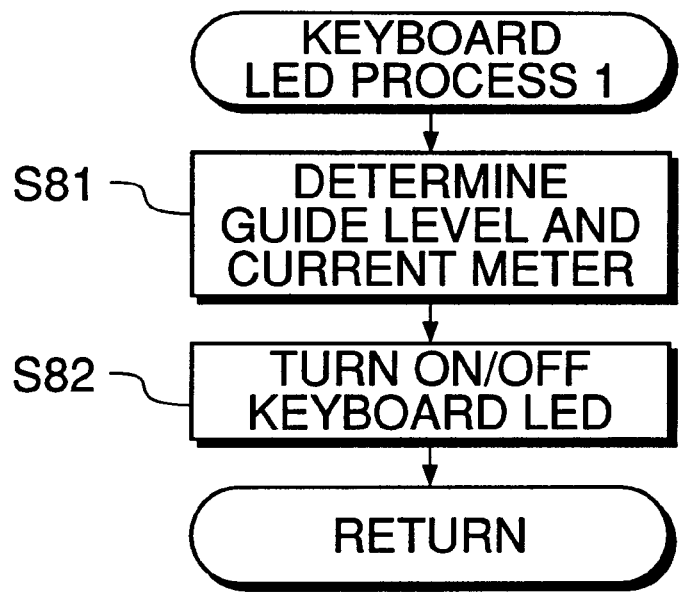
FIG. 9 is a flowchart showing in detail a flow of a keyboard LED process 1 subroutine in FIG. 4.

At the step S8, it is determined whether the present processing timing is timing of an odd-number multiple of eighth note or not. If the step S8 determines that the present processing timing is timing of an odd-number multiple of eighth note, a keyboard LED process 1 subroutine which will be described later using FIG. 9 is executed at a step S9. If the present processing timing is not timing of an odd-number multiple of eighth note, on the other hand, the step S9 is skipped and the control flow goes to a step S10.

Figure 10:
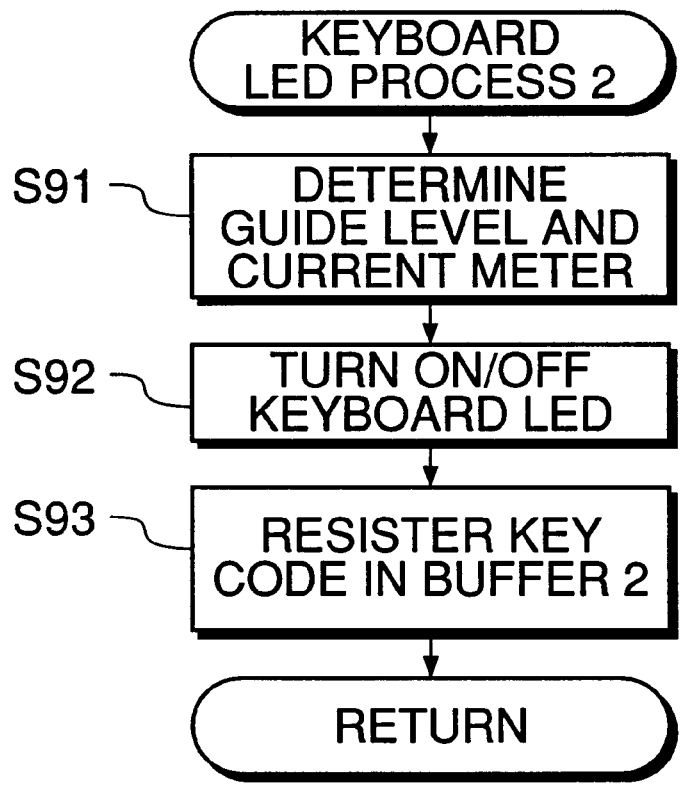
FIG. 10 is a flowchart showing in detail a flow of a keyboard LED process 2 subroutine of FIG. 4.

At the step S10, it is determined whether the present processing timing is timing of an even-number multiple of eighth note or not. If the step S10 determines that the present processing timing is timing of an even-number multiple of eighth note, a keyboard LED process 2 subroutine which will be described later using FIG. 10 is executed at a step S11. If the present processing timing is not timing of an even-number multiple of eighth note, on the other hand, the step S11 is skipped and the control flow goes to a step S12.

To make determinations at the steps S8 and S10 on the odd-number or even-number multiple of the eighth note, a software counter (measure counter) for counting time intervals in one measure may be provided in a predetermined area of the RAM 7, and the determinations may be made each time the value of this measure counter becomes equal to a multiple of one eighth of a counter value for the whole measure. Needless to say, the method of determining the timing is not limited to this method, but may be any method that can determine the timing based on the eighth note.

Figure 11:
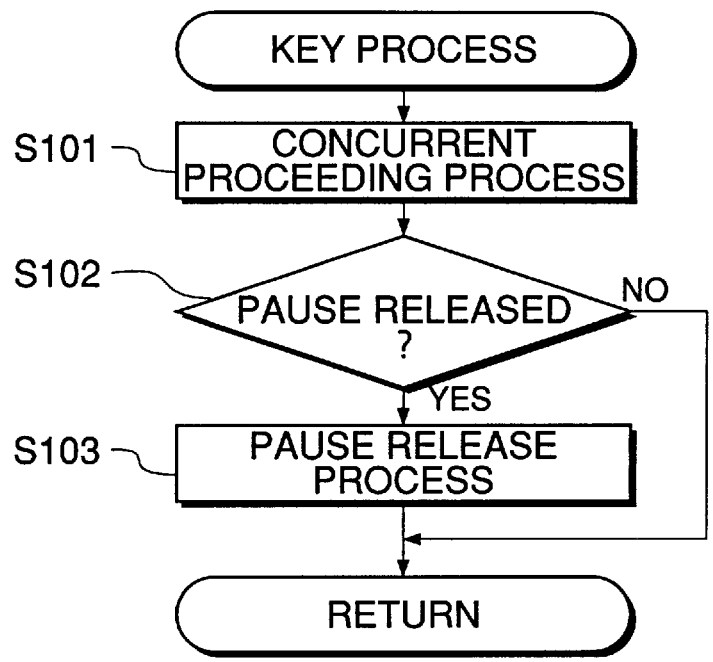
FIG. 11 is a flowchart showing in detail the flow of a key process subroutine in FIG. 4.

At the step S12, it is determined whether any key event, namely, a key-depression event or key-release event, has occurred or not. If the step S12 determines that a key event has occurred, a key process subroutine which will be described later using FIG. 11 is executed at a step S13. If no key event has occurred, the step S13 is skipped and a step S14 is then executed.

At the step 14, other processes than the above-described processes are performed, and then the control flow returns to the step S2, and the above-described processes are repeated.

The counting of the concurrent proceeding timer and reproduction process timer as indicated above is effected in a timer interrupt routine which will be described later using FIG. 12.

Figure 5:
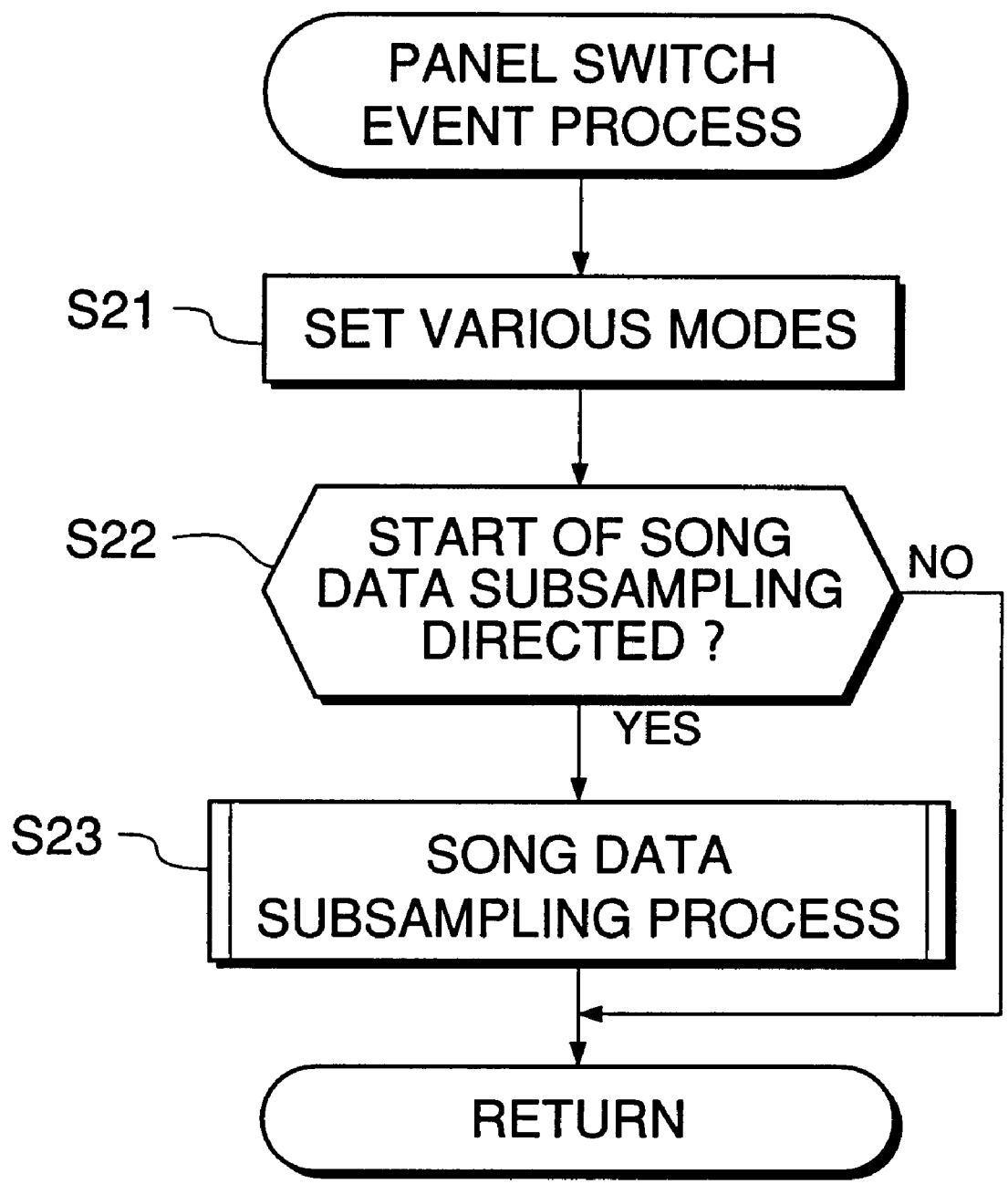
FIG. 5 is a flowchart showing in detail a flow of a panel switch event subroutine in FIG. 4.

FIG. 5 is a flowchart showing in detail the flow of the panel switch event process subroutine of the above-indicated step S3.

In FIG. 5, a step S21 is initially executed to set various modes depending upon a switch event that occurs when a switch on the switch panel 2 is operated by the player. The modes set at this step may include: a tune or song data subsampling routine execution mode in which the player can direct start and stop of a process of subsampling the automatic performance data (hereinafter referred to as "song data subsampling process") for thinning the automatic performance data; an automatic performance mode in which the player can direct start and stop of automatic performance; a performance guide mode in which the player can direct on- and off-states of a performance guidance function in which the player can turn on and off the performance guidance function; and a part setting mode in which the player can direct operative and inoperative states of right-hand and left-hand parts.

At the next step S22, it is determined whether the start of the song data subsampling routine has been directed or not. If it has been directed, the song data subsampling process subroutine which will be described later using FIG. 6 is executed at a step S23, and then the present panel switch event process subroutine is terminated.

If the step S22 determines that the start of the song data subsampling routine has not been directed, the present panel switch event process subroutine is immediately terminated.

Figure 6:
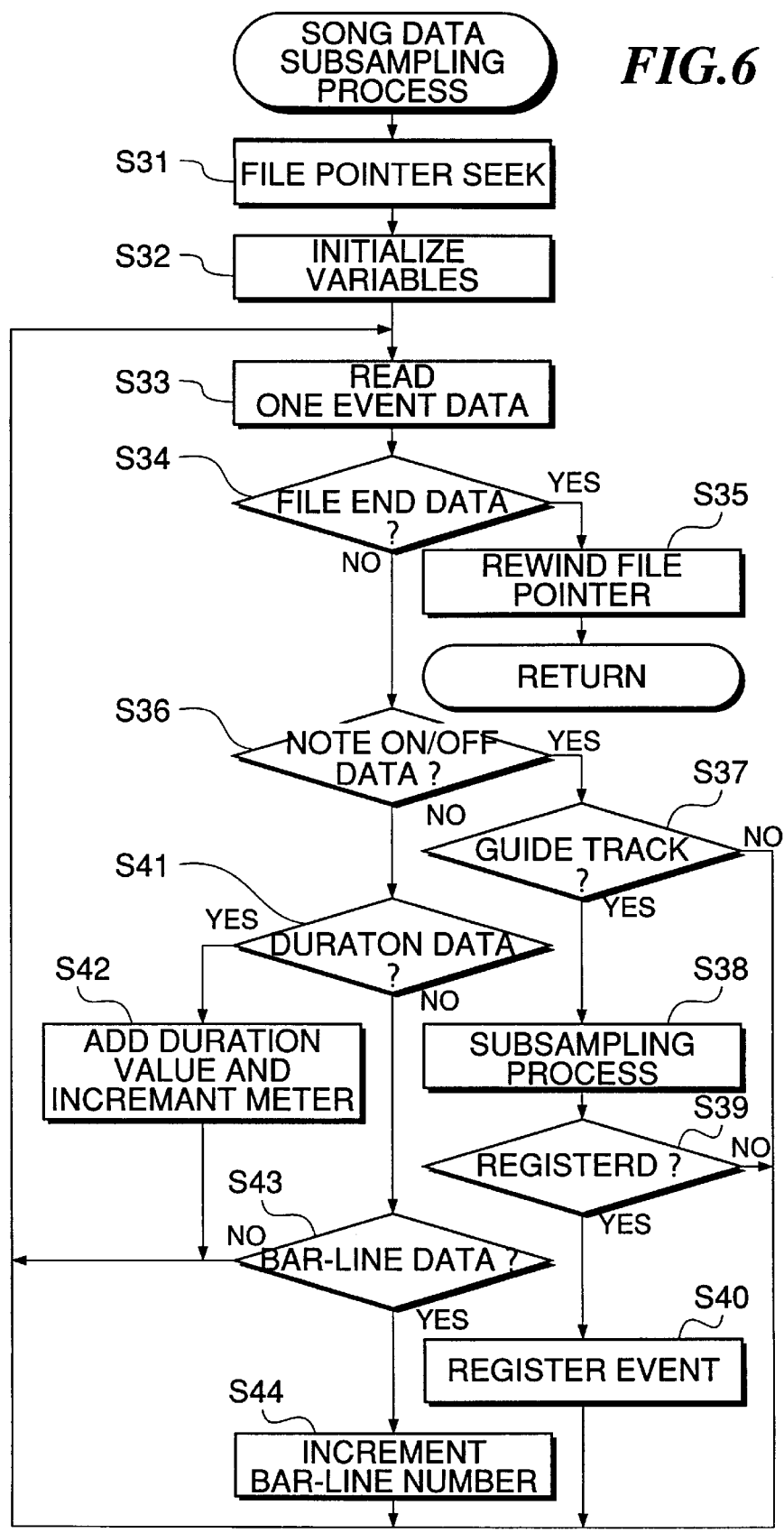
FIG. 6 is a flowchart showing in detail a flow of a song data subsampling (thinning) process subroutine in FIG. 5.

FIG. 6 is a flowchart showing in detail the flow of the above-indicated song data subsampling process subroutine. In this subroutine, the CPU 5 mainly performs a process for registering data (key codes) in the subsampled data buffer as shown in FIG. 3.

In FIG. 6, a step S31 is initially executed to seek the head of the automatic performance data that have been designated to be played, and perform a file pointer seeking process for locating a file pointer at the position of the head of the automatic performance data. Since the automatic performance data are stored in the song data storage area of the RAM 7 in the present embodiment, the file pointer seeking process is effected so that the file pointer designates the address location of the head of the relevant automatic performance data.

A step S32 is then executed to initialize various variables used in the present subroutine, which include a writing pointer used for registering data in the subsampled data buffer.

At the next step S33, the above-indicated file pointer is incremented by "1", and event data stored at the location designated by the file pointer is read out. At a step S34, it is determined whether the event data thus read are file end data as indicated above or not. If the step S34 determines that the read event data are the file end data, the file pointer is rewound (returned to its original position) at a step S35, and the present song data subsampling process subroutine is terminated. If the read event data are not the file end data, on the other hand, it is determined at a step S36 whether the event data are note-on/note-off event data as described above.

If the step S36 determines that the read data are the note-on/note-off event data, it is determined at a step S37 whether the relevant data belong to a guide track, namely, to the MIDI channel 1 or 2.

If the step S37 determines that the read note-on/note-off event data belong to the guide track, a process for subsampling the note event data to thin the same is executed at a step S38.

Figure 14:
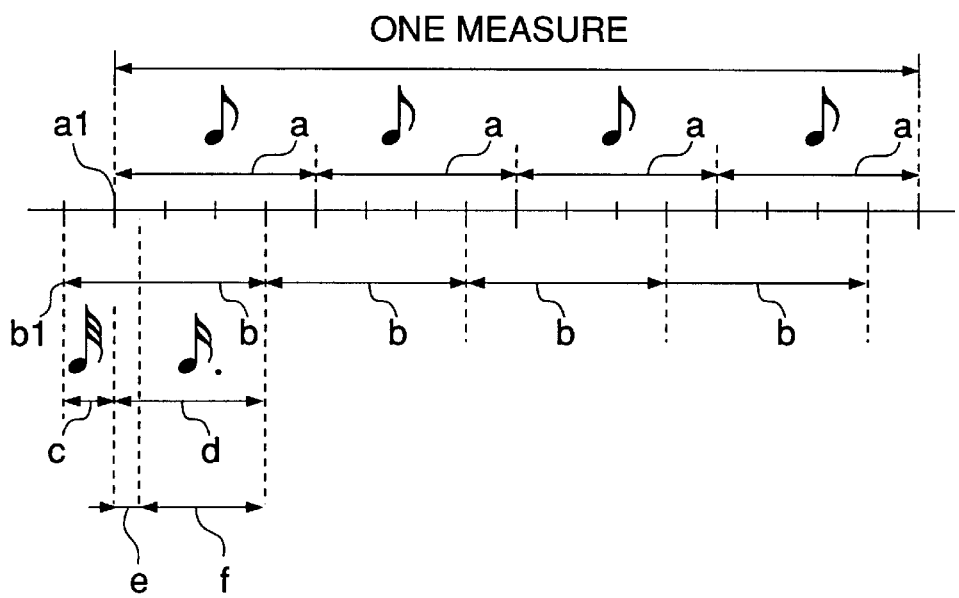
FIG. 14 is a view useful in explaining the subsampling (thinning) process of FIG. 6.

FIG. 14 is a view for explaining this subsampling routine. In the present embodiment, one measure is divided into four sections to extract or sample out one event data for each quarter note (in the range of the length of a quarter note) from the automatic performance data as described above. Namely, one measure is equally divided into four note length ranges "a" each having the length of one quarter note. Since the event data to be extracted is not necessarily located at the position of the head a1 of the note length range "a", the range to be extracted within which one event data is to be extracted is moved from the note length range "a" to another note length range "b". Namely, the head position of the note length range within which one event data is to be extracted is shifted ahead from the position "a1" to "b1" by a note length range "c" corresponding to the length of one sixteenth note, and data that meet conditions as described below are extracted from the automatic performance data within the note length range of quarter note that starts from the position "b1" (which range consists of the note length range "c" of the sixteenth note and a note length range "d" corresponding to the length of one dotted eighth note). Where any event data that has been previously extracted are present in the above-described sample range, namely, where any event data have already been stored in the registering area of the subsampled data buffer, the event data that have been previously registered are compared with event data that are extracted in the current control cycle. Only when the event data that are extracted in the current cycle meet the following conditions better than the event data previously registered, the event data previously registered are replaced by the event data that are extracted in the current control cycle.

1) If the event data represent a chord (key-on event that occurs continuously over a duration less than a predetermined time), event data of the highest pitch is to be extracted or picked up when the chord is given by the above-indicated right-hand data, while event data of the lowest pitch is to be extracted when the chord is given by the left-hand data.

2) In a range consisting of the note length range (range "c") of sixteenth note starting from the head of the sampling range and a note length range (range "e") corresponding to one thirty-second note and starting from the end of the first meter, the key-on event that occurs later is given priority. In a range "f" following the above range and ending at the rear end of the sampling range, the key-on event that occurs earlier is given priority.

The conditions for extracting event data are not limited to the above-mentioned ones but various other conditions may be employed.

Referring back to FIG. 6, a step S39 is executed to determine whether any event data (key code) are registered in the area of the subsampled data buffer that corresponds to the current bar-line number and beat number, and if no data have been registered, a step S40 is then executed to resister in this area the key code of the event extracted in the above-described subsampling routine. If any key code has been registered in the above area of the subsampled data buffer, on the other hand, the event data corresponding to the key code are compared with the event data extracted in the above subsampling routine, and the control flow goes to a step S40 only when the thus extracted event data satisfy the above-described conditions better, and the key code registered in the buffer is replaced by the key code corresponding to the extracted event data.

If the step S36 determines that the data read out at the step S33 are not a note-on/note-off event data, a step S41 is executed to determine if the relevant data are duration data or not. If the step S41 determines that the read data are duration data, a duration value represented by the duration data is added to a duration accumulation counter provided in a predetermined area of the RAM 7, so as to accumulate duration data in one measure, and at the same time the beat is incremented based on the result of the addition at a step S42. At this step, the beat is incremented by incrementing a software counter (hereinafter hereinafter referred to as "the first beat counter") provided in a predetermined area of the RAM 7. The beat is incremented by "1" each time the value of the duration accumulation counter becomes equal to a multiple of "96" where "96" is set as duration data corresponding to the length of one quarter note, for example.

In the subsampling routine at the step S38, the determination as to which of the ranges "a" to "f" of FIG. 14 the read event data exist in is made by observing the count value of this duration accumulation counter.

If the step S41 determines that the data read at the step S33 are not duration data, on the other hand, it is determined at a step S43 whether the relevant data is bar-line data or not. If the step S43 determines that the read data are bar-line data, a software counter (hereinafter referred to as "first bar-line number counter") provided in a predetermined area of the RAM 7 is incremented by "1" so as to count the bar-line number, while at the same time the first measure counter is cleared to be "0", and thereafter the control flow returns to a step S33. If the read data are not bar-line data, the control flow immediately returns to the step S33.

By the above described processing, one typical event data within each range of a quarter note is extracted and the extracted event data is stored in the subsampled data buffer. In the case of automatic performance data where there is no event data in a range of a quarter note, no event data may be stored in an area of the subsampled data buffer corresponding to the range, or the same event data as event data within a range before or after the above range may be stored in the area of the subsampled data buffer corresponding to the range as proper event data.

FIG. 7 is a flowchart showing in detail the flow of the concurrent proceeding timer process subroutine of step S5 in FIG. 4.

Initially, where key-depression event data (key code KC) are stored in the buffer 1 or 2, a step 51 is executed to perform a guide timer process for clearing the concurrent proceeding timer, by adding the value of the concurrent proceeding timer to the elapsed time data (time KC) stored in association with the key code KC. In this connection, the buffer 1 is a buffer into which are written key codes KC corresponding to key-on events that occur when keys are depressed by the player, as described above, and the writing of the key codes KC is effected in the key process subroutine of the step S13 (which will be described later in detail using FIG. 11). The buffer 2, on the other hand, is a buffer into which are written key codes KC corresponding to note-on events on guide tracks which occur during reproduction of the automatic performance data, and the writing of the key codes KC is effected in the reproduction process subroutine of the step S7 (which will be described later in detail using FIG. 8), or in the keyboard LED process 2 subroutine of the step S11 (which will be described later in detail using FIG. 10). The data written into the buffer 1 are deleted when a predetermined time period has elapsed after the key code was written into the buffer 1 or when the same key code as one currently stored in the buffer 2 is written into the buffer 1. The data written in the buffer 2 are deleted when the same key code as one currently stored in the buffer 1 is written into the buffer 2. Simultaneously with the deletion, a keyboard LED which has been lighted in correspondence to the data so far written the buffer 2 is turned off. The above deleting and LED turning-off processing is also carried out in the guide timer process at the step S51.

At the next step S52, it is determined whether the reproduction of the automatic performance data is to be temporarily stopped (paused) or not. More specifically, the data stored in the buffer 1 are compared with the data stored in the buffer 2, and if any key code KC that has been stored in the buffer 2 for a predetermined time period is not stored in the buffer 1, the step S52 determines that the reproduction should be paused. If there is any key code KC that is stored in the buffer 2 but not stored in the buffer 1, and the above predetermined time period has not elapsed since the key code KC was stored in the buffer 2, the step S52 determines that the reproduction should be continued (should not be paused).

If the step S52 determines that the reproduction is to be paused, a step S53 is executed to set a pause request flag FPAUSE to "1" that represents the request for the pause, and then the present concurrent proceeding timer process subroutine is terminated.

If the step S52 determines that the reproduction is not to be paused, a step S54 is executed to reset the pause request flag FPAUSE to "0", and then the present concurrent proceeding timer process subroutine is terminated.

FIG. 8 is a flowchart showing in detail the flow of the reproduction process subroutine of the step S7 of FIG. 4.

In FIG. 8, a step S61 is initially executed to read out one event data at a location designated by a reproduction pointer provided in a predetermined area of the RAM 7, so as to reproduce the automatic performance data. A step S62 is then executed to determine whether the event data thus read are note-on/note-off event data.

If the step S62 determines that the read event data are note-on/note-off event data, it is determined at a step S63 whether the relevant note event data belong to a (any) guide track (channel 1 or channel 2).

If the step S63 determines that the read note event data belong to the guide track, a step S64 is executed to perform the concurrent proceeding process depending upon the type of the event data and the currently selected performance guide level. More specifically, if the currently selected performance guide level is "guide level 3", and the read event data are note-on event data, the key code KC corresponding to the note-on event is written into the buffer 2 shown in FIG. 13 and a keyboard LED corresponding to the key code KC is lighted. The timing of lighting the LED need not be made concurrently with the reading-out of the note-on event data, but note-on event data may be read out in advance so that the corresponding LED may be lighted a predetermined time earlier than the actual reading-out of the note-on event data. If the read event data are note-off event data, on the other hand, nothing is done. If the currently selected performance guide level is one of 0 to 2, the concurrent proceeding process based on the read-out note event data is not effected.

If the determination at the step S63 indicates that the read note event data do not belong to any guide track, a MIDI signal (code) corresponding to the event data is delivered to the tone generator circuit 15 or the other MIDI equipment 100 via the MIDI interface 13, and the present reproduction process subroutine is terminated. By executing the step S56, a musical tone on the accompaniment track is generated.

If the determination at the step S62 indicates that the read event data are not note-on/note-off event data, it is determined at a step S66 whether the read note invent data are duration data. If the step S62 determines that the read event data is duration data, a step S67 is executed to update the value of the above-indicated reproduction process timer according to the following equation:

reproduction process timer=reproduction process timer value+duration value×tempo factor A step S68 is then executed to increment a software counter (hereinafter referred to as "the second beat counter") provided in a predetermined area of the RAM 7 for counting beats in the present reproduction process. Thereafter, the present reproduction process subroutine is terminated. In this connection, a counter that performs a similar function to the duration accumulation counter used at the step S42 of FIG. 6 may be provided, and the second beat counter may be incremented based on the value of this counter.

If the determination at the step S66 indicates that the read event data are not duration data, a step S69 is then executed to determine whether the read event data are tempo data or not.

If the step S69 determines that the read event data are tempo data, a step S70 is executed to change the tempo factor depending upon the tempo data. If the read event data are not tempo data, a step S71 is then executed to determine whether the read event data are bar-line data or not.

If the determination at the step S71 indicates that the read event data are bar-line data, a step 72 is executed to increment by "1" a software counter (hereinafter referred to as "the second bar-line number counter") provided in a predetermined position of the RAM 7 for counting the bar-line number, and at the same time clear the second beat counter to "0". After execution of the step S72, the present reproduction process subroutine is terminated. If the read data are not bar-line data, on the other hand, the present reproduction process subroutine is immediately terminated.

FIG. 9 is a flowchart showing in detail the flow of the keyboard LED process 1 subroutine of the step S9 in FIG. 4.

In FIG. 9, a step S81 is initially executed to compare the currently selected guide level with the current beat (value of the second beat counter), and determine whether the timing is for turning on the keyboard LED or for turning off the LED.

Then, a step S82 is executed to turn on/off the keyboard LED depending upon the result of the determination at the step S81, followed by the present keyboard LED process 1 subroutine being terminated.

FIG. 10 is a flowchart showing in detail the flow of the keyboard LED process 2 subroutine of the step S11 in FIG. 4.

In FIG. 10, a step S91 is initially executed to determine whether the current processing timing is for turning on the keyboard LED or for turning off the LED, as at the step S81 of FIG. 9. A step S92 is then executed to turn on/off the keyboard LED depending upon the result of the determination at the step S91, as at the step S82 in FIG. 9.

Then, at a step S93, the key code corresponding to the read event data is read from the subsampled data buffer and registered in the buffer 2 at timing suitable for the selected guide level (excluding guide level 3), and thereafter the present keyboard LED process 2 subroutine is terminated.

Figure 15:
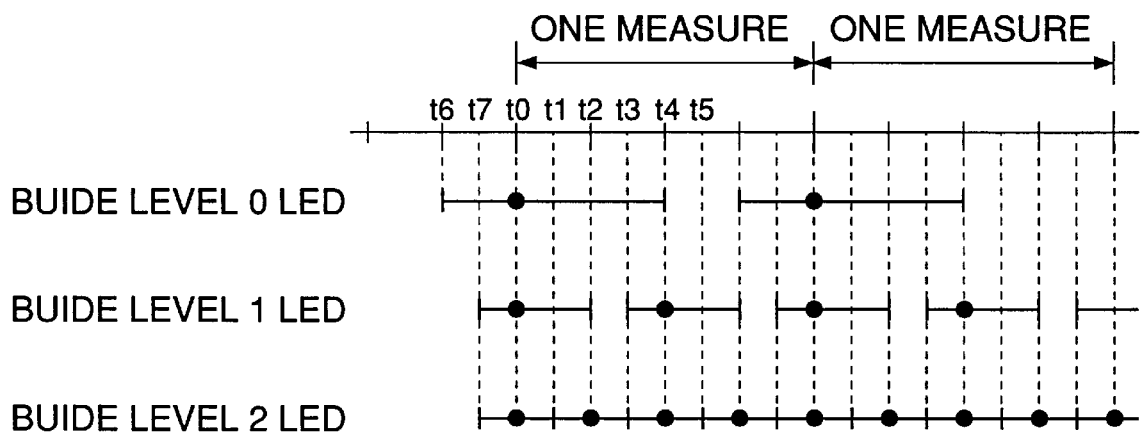
FIG. 15 is a view showing the timing in which a keyboard LED is turned on and off depending upon the guide level.

FIG. 15 is a view showing the timing at which the keyboard LED is turned on/off depending upon the guide level. Referring to FIG. 15, the keyboard LED processes of FIG. 9 and FIG. 10 will be described in more detail.

In FIG. 15, where the guide level 0 is selected, when the reproduction of the automatic performance data reaches the point of time (timing t6) that is six times the eighth note as counted from the beginning of one measure, a keyboard LED corresponding to a key code stored in the subsampled data buffer at a location corresponding to a beat position next to the above time point is turned on in the above-described keyboard LED process 2 (steps S91, S92). When the reproduction reaches the point of time (timing t0) that is eight times the eighth note, the key code stored at the location of the subsampled data buffer corresponding to the beat position is registered in the buffer 2 in the keyboard LED process 2 (step S93), and when the reproduction reaches the point of time (timing t4) that is two times the eight note as counted from t0, the keyboard LED that has been turned on is turned off in the keyboard LED process 2 (steps S91, S92). Thus, by the above processing, only the key code corresponding to the first beat of each measure stored in the subsampled data buffer is registered in the buffer 2 and subjected to the concurrent processing process. In this case, the keyboard LED corresponding to the registered key code is lighted in timing a quarter note earlier.

Where the guide level 1 is selected, when the reproduction of the automatic performance data reaches the point of time (timing t3) that is three times the eighth note or the point of time (timing t7) that is seven times the eighth note as counted from the beginning of one measure, a keyboard LED corresponding to a key code stored in the subsampled data buffer at a location corresponding to a beat position next to the above time point is turned on in the keyboard LED process 1 (steps S81, S82). When the reproduction reaches the point of time (timing t4) that is four times the eighth note or the point of time (timing t0) that is eight times the eighth note, the key code stored at the location of the subsampled data buffer corresponding to the beat position is registered in the buffer 2 in the keyboard LED process 2 (step S93), and when the reproduction reaches the point of time (timing t6) that is six times the eighth note or the point of time (timing t2) that is twice the eighth note as counted from the timing t0, the keyboard LED that has been turned on is turned off in the keyboard LED process 2 (steps S91, S92). Thus, by the above processing, only the key code corresponding to the first beat or the third beat of each measure stored in the subsampled data buffer is registered in the buffer 2 and subjected to the concurrent processing process. In this case, the keyboard LED corresponding to the registered key code is lighted in timing an eighth note earlier.

Where the guide level 2 is selected, when the reproduction of the automatic performance data reaches the point of time (timing t7) that is seven times the eighth note, the point of time (timing t1) that is equal to the eighth note, the point of time (timing t3) that is three times the eighth note or the point of time (timing t5) that is five times the eighth note as counted from the beginning of one measure, a keyboard LED corresponding to a key code stored in the subsampled data buffer at a location corresponding to a beat position next to the above time point is turned on in the keyboard LED process 1 (steps S81, S82). When the reproduction reaches the point of time (timing t0) that is eight times the eighth note, the point of time (timing t2) that is two times the eighth note, the point of time (t4) that is four times the eighth note or the point of time (timing t6) that is six times the eighth note, the key code stored at the location of the subsampled data buffer corresponding to the beat position is registered in the buffer 2 in the keyboard LED process 2 (step S93), and when the reproduction reaches the point of time (timing t1) that is equal to the eighth note, the point of time (timing t3) that is three times the eighth note, the point of time (timing t5) that is five times the eighth note or the point of time (timing t7) that is seven times the eighth note as counted from the timing t0, the keyboard LED that has been lighted is turned off and at the same time the next keyboard LED is turned on in the keyboard LED process 2 (step S81, S82). Thus, by the above processing, the key code corresponding to every beat of each measure stored in the subsampled data buffer is registered in the buffer 2 and subjected to the concurrent processing process. In this case, the keyboard LED corresponding to the registered key code is lighted in timing an eighth note earlier.

Where the performance guide level 3 is selected, the key code of event data read at the step S64 in FIG. 8, referred to hereinbefore, is registered in the buffer 2, and therefore the processes of FIGS. 9 and 10 are not executed.

FIG. 11 is a flowchart showing the flow of the key process subroutine of the step S13 in FIG. 4.

In FIG. 11, a step S101 is initially executed to perform concurrent proceeding process in response to depression or release of a key. More specifically, when a key is depressed, the key code KC corresponding to the depressed key is written into the buffer 1 of FIG. 14 and the key-on event data corresponding to the key code are delivered to the tone generator circuit 15 or the other MIDI equipment 100 via the MIDI interface 13 to generate a musical tone corresponding to the depressed key. When a key is released, on the other hand, the key-off event data corresponding to the release of the key are delivered to the tone generator circuit 15 or the other MIDI equipment 100 via the MIDI interface 13 to stop generation of a musical tone corresponding to the released key.

A step S102 is then executed to determine whether the pause state is to be released or not. At this step, the determination as to whether the pause state is to be released or not is made by comparing the corresponding contents of the buffers 1 and 2, and determine whether the key has been depressed that corresponds to the automatic performance data that have been held in the pause state.

If the step S102 determines that the pause state is to be released, a step S103 is then executed to perform a pause release process by resetting the pause request flag FPAUSE to "0", deleting the key code corresponding to the released key written in the buffer 1 and the buffer 2 from these buffers, turning off the keyboard LED corresponding to the released key, which has been lighted, for example. If the automatic performance data is not held in the pause state, or the pause state is not to be released, the present key process subroutine is terminated.

Figure 12:
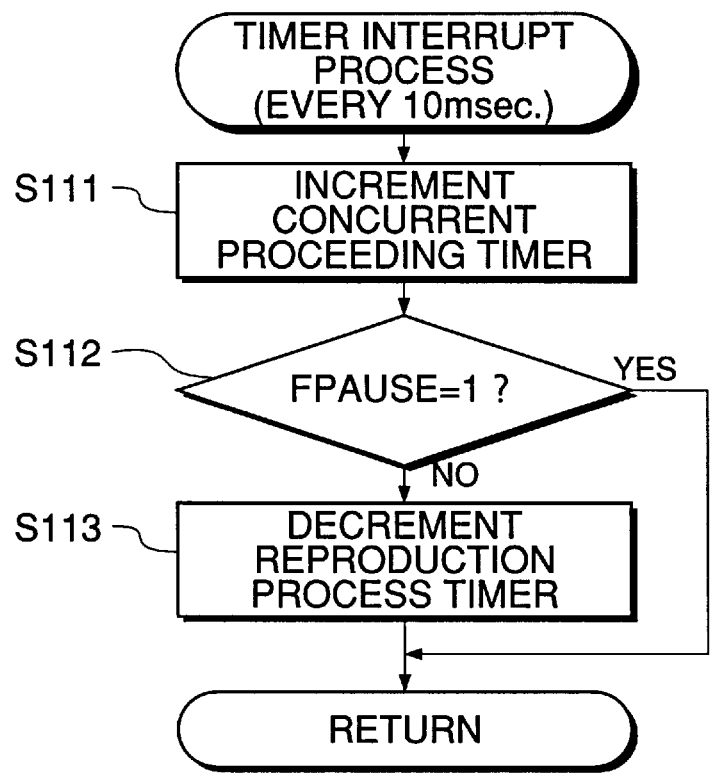
FIG. 12 is a flowchart showing a flow of a timer interrupt routine.

FIG. 12 is a flowchart showing the flow of the timer interrupt routine. This timer interrupt routine is executed in response to an interrupt signal which the timer 8 produces and delivers to the CPU 4 every 10 msec.

In FIG. 12, a step S111 is initially executed to increment by "1", the above-indicated concurrent proceeding timer.

Then, a step S112 is executed to determine the current state of the pause request flag FPAUSE, and if the pause request flag FPAUSE is set to "1", namely, if the reproduction of the automatic performance data is being paused, the present timer interrupt routine is immediately terminated. If the pause request flag FPAUSE is set to "0", namely, if the reproduction is not being paused, on the other hand, the control flow goes to a step S113 to decrement the reproduction process timer by "1", and the present timer interrupt routine is terminated. Thus, if the pause request is established (FPAUSE=1), the decrementing of the reproduction process timer is stopped and the main flow does not proceed to the reproduction process of FIG. 8, whereby the reproduction of the automatic performance data is temporarily stopped.

Although various other processes are actually performed in the timer interrupted routine, these processes are not essential for explaining the present invention, and thus description thereof is omitted.

As described above, according to the present embodiment, performance guide data for guiding the player through the performance are produced by thinning conventional automatic performance data to extract selected portions thereof based on predetermined conditions. This make it possible to produce the performance guide data depending upon the level of the player, thereby saving time and effort for finding performance guide data that match or suite the performance level of the player.

Further, it is possible to select data to be used from the thus produced performance guide data, depending upon the level of the player (guide levels 0 to 2 in the present embodiment), and also possible to provide performance guide (guide level 3) of the original tune or song. Thus, a wide range of performance guide can be provided depending upon the performance level that varies from the beginners's level to the senior's level.

From a standpoint of a producer that produces the performance guide data, a plurality of arranged guide data for different performance levels need not be produced, which leads to reduction in the cost of manufacturing the whole apparatus.

Moreover, since any special data are not used as the automatic performance data in the present embodiment, the automatic performance data may be produced based on music software (automatic performance data) that has been commercially available, thus permitting the player to choose and practice tunes and songs of his/her favorite genre.

While the range in which data are extracted from the automatic performance data and the conditions used for extracting data from the automatic performance data are fixed or invariably established in the illustrated embodiment, these range and conditions are not necessarily fixed, but may be changed depending upon the level of the player. For example, while "measure" is used as the range in which data are extracted from the automatic performance data in the illustrated embodiment, the present invention is not limited to this method, but may employ a method in which the automatic performance data is divided into phrases, and event data located at the head of each phrase is extracted. Further, as the conditions used for extracting data from the automatic performance data, for example, if the selected performance level is low, note length ranges into which one measure is divided and from each of which one event data is to be extracted or thinned out from the automatic performance data may be longer note length ranges than the range of a quarter note as employed in the above described embodiment, e.g. ranges of the length of a half note.

The automatic performance data may be divided into phrases using a method as disclosed in Japanese Laid-Open Patent Publication (Kokai) No. 8-211867 filed by the present assignee and laid open to the public after the priority date of the present application. Also, the conditions for extracting the data are not limited to those as listed in the illustrated embodiment.

The performance level may be separately established for right-hand data and left-hand data. This arrangement is most advantageous where the player can play the right-hand part of a tune or a song to some degree with the right hand, but has a difficulty in moving the left hand to play the left-hand part of the tune or song.

While the event data are extracted and thinned out prior to the performance in the illustrated embodiment, the data may be extracted in real time with the performance proceeding at the same time.

While only the keyboard LED corresponding to the key that should be depressed at the present time is turned on in the illustrated embodiment, the present invention is not limited to this arrangement. For example, a plurality of keyboard LEDs may be preliminarily turned on, and one or more of these LEDs that correspond(s) to the keys to be depressed at the present time may be flickered, as disclosed in Japanese Laid-Open Patent Publication (Kokai) No. 8-211867 filed by the present assignee.

While the change of the tempo is accomplished by changing the tempo factor thereby to modify the value of the timing data in the illustrated embodiment (steps S68 to S70 in FIG. 9), the present invention is not limited to this method. For example, the cycle of a tempo clock may be changed, or the value (count value) used for counting the timing data in one processing may be changed.

While the present invention is applied to an electronic keyboard instrument in the illustrated embodiment, the invention may be applied to other apparatus or devices, such as that in the form of a personal computer and an application program. The present invention is also applicable to such an apparatus as karaoke system.

In the illustrated embodiment, the present invention is realized in the form of the electronic keyboard instrument as shown in FIG. 1 that incorporates a tone generator (tone generator circuit 12, effect circuit 13 and sound system 14) and an automatic performance device (CPU 5). The present invention, however, may be realized in the form of an apparatus in which these devices are provided as separate or independent devices, which are connected to each other by communication means such as an MIDI interface or various kinds of networks, for example.

While the present invention is applied to an electronic keyboard instrument in the illustrated embodiment, the invention may be applied to a piano that is not an electronic instrument, or may also applied to any type of instrument, such as stringed instruments, wind instruments or percussion instruments.

What is claimed is:

1. A performance instructing apparatus comprising:
    performance level input means for entering a performance level; and
    data extracting means for extracting data that meet a predetermined condition for each of sequential predetermined sections of automatic performance data to be reproduced in a manner corresponding to said performance level entered by said performance level input means.

2. A performance instructing apparatus according to claim 1, further including performance guide means for providing a performance guide using the data extracted by said data extracting means.

3. A performance instructing apparatus according to claim 1, wherein each predetermined section is a measure of said automatic performance data.

4. A performance instructing apparatus according to claim 1, wherein each predetermined section is a phrase of said automatic performance data.

5. A performance instructing apparatus according to claim 1, wherein said predetermined condition includes a condition that the data that is to be extracted from said automatic performance data is event data representing a chord and has a predetermined pitch.

6. A performance instructing apparatus according to claim 1, wherein said predetermined condition includes a condition that the data that is to be extracted from said automatic performance data is event data corresponding to a key-on event occurring latest in a first predetermined portion of said predetermined range or event data corresponding to a key-on event occurring earliest in a latter predetermined portion of said predetermined range.

7. A performance instructing apparatus according to claim 2, wherein each predetermined section is a measure of said automatic performance data.

8. A performance instructing apparatus according to claim 2, wherein each predetermined section is a phrase of said automatic performance data.

9. A performance instructing apparatus comprising:
    data extracting means for extracting data that meet a predetermined condition from each of sequential predetermined sections of automatic performance data to be reproduced;
    performance level input means for entering performance level; and
    changing means for changing said predetermined sections and said predetermined condition used when said data extracting means extract the data, depending upon the performance level entered through said performance level input means.

10. A performance instructing apparatus according to claim 9, further including performance guide means for providing a performance guide using the data extracted by said data extracting means.

11. A performance instructing apparatus according to claim 9, wherein each predetermined section is a measure of said automatic performance data.

12. A performance instructing apparatus according to claim 9, wherein each predetermined section is a phrase of said automatic performance data.

13. A performance instructing apparatus according to claim 9, wherein said predetermined condition includes a condition that the data that is to be extracted from said automatic performance data is event data representing a chord and has a predetermined pitch.

14. A performance instructing apparatus according to claim 9, wherein said predetermined condition includes a condition that the data that is to be extracted from said automatic performance data is event data corresponding to a key-on event occurring latest in a first predetermined portion of said predetermined range or event data corresponding to a key-on event occurring earliest in a latter predetermined portion of said predetermined range.

15. A performance instructing apparatus according to claim 10, wherein said performance guide means comprises display means operable at a frequency depending upon the performance level entered through said performance level input means.

16. A performance instructing apparatus according to claim 10, wherein each predetermined section is a measure of said automatic performance data.

17. A performance instructing apparatus according to claim 10, wherein each predetermined section is a phrase of said automatic performance data.

18. A performance instructing apparatus comprising:
    data extracting means for extracting data that meet a predetermined condition from each of sequential predetermined sections of automatic performance data;
    performance level input means for entering a performance level;
    extracted data selecting means for selecting data from the data extracted by said data extracting means, depending upon the performance level entered through said performance level input means; and
    performance guide means for providing a performance guide using the data selected by said extracted data selecting means.

19. A machine readable storage medium storing a program for instructing execution of a performance instructing method comprising:

a performance level input step of entering a performance level; and a data extracting step of extracting data that meet a predetermined condition, from each predetermined range of automatic performance data to be reproduced in a manner corresponding to said performance level entered by said performance level input step.

20. A machine readable storage medium storing a program for instructing execution of a performance instructing method comprising:

a data extracting step for extracting data that meet a predetermined condition, from each of sequential predetermined sections of automatic performance data;

a performance level input step of entering a performance level; and a changing step of changing said predetermined range and said predetermined condition used when said data extracting step extracts the data, depending upon the performance level entered through said performance level input step.

21. A machine readable storage medium storing a program for instructing execution of a performance instructing method comprising;

a data extracting step of extracting data that meet a predetermined condition, from each of sequential predetermined sections of automatic performance data;

a performance level input step of entering a performance level;

an extracted data selecting step of selecting data from the data extracted by said data extracting step, depending upon the performance level entered through said performance level input step; and a performance guide step of providing a performance guide using the data selected by said extracted date selecting step.

22. A performance instructing apparatus comprising:

a performance level input device for enabling a performer to select a performance level; and a data extracting device for extracting data that meet a predetermined condition from each of sequential predetermined sections of automatic performance data to be reproduced in a manner corresponding to said performance level entered by said performance level input device.

23. A performance instructing apparatus comprising:

a data extracting device for extracting data that meet a predetermined condition from each of sequential predetermined sections of automatic performance data to be reproduced;

a performance level input device for enabling a performer to select a performance level; and a changing device for changing said predetermined sections and said predetermined sections of said predetermined condition used when said data extracting device extracts the data, depending upon the performance level entered through said performance level input device.

24. A performance instructing apparatus comprising:

a data extracting device for extracting data that meet a predetermined condition from each of sequential predetermined sections of automatic performance data;

a performance level input device for enabling a performer to select a performance level;

an extracted data selecting device for selecting data from the data extracted by said data extracting device, depending upon the performance level entered through said performance level input device; and a performance guide device for providing a performance guide using the data selected by said extracted data selecting device.

* * * * *